(12) United States Patent
Shimizu et al.

(10) Patent No.: US 11,456,513 B2
(45) Date of Patent: Sep. 27, 2022

(54) BATTERY AND METHOD FOR PRODUCING THE SAME

(71) Applicant: SANYO Electric Co., Ltd., Daito (JP)

(72) Inventors: Kazumichi Shimizu, Osaka (JP); Shinya Mori, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 219 days.

(21) Appl. No.: 16/624,035

(22) PCT Filed: Jun. 21, 2018

(86) PCT No.: PCT/JP2018/023567
§ 371 (c)(1),
(2) Date: Dec. 18, 2019

(87) PCT Pub. No.: WO2019/004039
PCT Pub. Date: Jan. 3, 2019

(65) Prior Publication Data
US 2021/0151837 A1 May 20, 2021

(30) Foreign Application Priority Data
Jun. 28, 2017 (JP) .............................. JP2017-126115

(51) Int. Cl.
*H01M 50/536* (2021.01)
*H01M 50/533* (2021.01)
(Continued)

(52) U.S. Cl.
CPC ....... *H01M 50/536* (2021.01); *H01M 50/533* (2021.01); *H01M 50/531* (2021.01);
(Continued)

(58) Field of Classification Search
CPC ............. H01M 50/536; H01M 50/533; H01M 50/531; H01M 50/566; H01M 50/545; Y02E 60/10
(Continued)

(56) References Cited

U.S. PATENT DOCUMENTS

| 2005/0042506 A1 | 2/2005 | Tomimoto et al. |
| 2009/0317712 A1* | 12/2009 | Kim .................... H01M 50/531 |
| | | 429/164 |

(Continued)

FOREIGN PATENT DOCUMENTS

| CN | 101609903 A | 12/2009 |
| JP | 2005-44691 A | 2/2005 |

(Continued)

OTHER PUBLICATIONS

International Search Report dated Jul. 31, 2018, issued in counterpart application No. PCT/JP2018/023567, with English translation. (4 pages).

(Continued)

*Primary Examiner* — Jonathan G Jelsma
*Assistant Examiner* — Omar M Kekia
(74) *Attorney, Agent, or Firm* — WHDA, LLP

(57) ABSTRACT

A battery producible with high quality and at low costs by decreasing the output of an energy beam used to weld multiple current collecting tabs to an outer case and thus securing the sufficient margin of the output thereof. An aspect of the battery includes an overlapping part K of multiple current collecting tabs connected to a negative electrode of an electrode body being welded to an outer case via a weld group, and the weld group includes a weld part and weld part that are each in the form of a line when they are viewed from the outside of the outer case. The weld as a first weld serves to weld the outer case to all of the multiple (Continued)

current collecting tabs, and the weld as a second weld serves to weld the outer case to only one or some of the multiple current collecting tabs.

10 Claims, 7 Drawing Sheets

(51) Int. Cl.
  *H01M 50/566* (2021.01)
  *H01M 50/545* (2021.01)
  *H01M 50/531* (2021.01)

(52) U.S. Cl.
  CPC ........ *H01M 50/545* (2021.01); *H01M 50/566* (2021.01); *Y02E 60/10* (2013.01)

(58) Field of Classification Search
  USPC .......................................... 429/163
  See application file for complete search history.

(56) References Cited

U.S. PATENT DOCUMENTS

| | | | |
|---|---|---|---|
| 2011/0027644 | A1 | 2/2011 | Kiyama |
| 2013/0071727 | A1* | 3/2013 | Hirai ................... H01M 50/172 429/179 |
| 2017/0069901 | A1 | 3/2017 | Haraguchi et al. |
| 2017/0304943 | A1* | 10/2017 | Tsukui ................ B23K 26/206 |

FOREIGN PATENT DOCUMENTS

| | | |
|---|---|---|
| JP | 2007-273258 A | 10/2007 |
| JP | 2010-3686 A | 1/2010 |
| JP | 2015-162326 A | 9/2015 |
| JP | 2016-207412 A | 12/2016 |
| WO | 2009/128335 A1 | 10/2009 |
| WO | 2012/147425 A1 | 11/2012 |
| WO | 2017/085918 A1 | 5/2017 |

OTHER PUBLICATIONS

English Translation of Chinese Office Action dated Nov. 29, 2021, issued in counterpart CN application No. 201880043006.3. (4 pages).

* cited by examiner

US 11,456,513 B2

BATTERY AND METHOD FOR PRODUCING THE SAME

TECHNICAL FIELD

The present disclosure relates to a battery of which multiple current collecting tabs and an outer case have been welded to each other and to a method for producing such a battery.

BACKGROUND ART

In recent years, secondary batteries are incorporated into electronic equipment, such as a computer, and also expected as a power source that supplies electric power to a motor used for driving vehicles. Lithium ion secondary batteries can produce high energy but have a fear that the batteries themselves may emit heat when foreign metal or another substance intrudes into the batteries and then causes internal short-circuits.

An outer case is typically connected to a current collecting tab mainly by resistance welding. In the process of resistance welding, however, sputter is caused inside a battery, and foreign metal therefore intrudes into the battery, which results in voltage defects that lead to the deterioration of the manufacturing quality, safety, and reliability of the battery. Hence, in recent years, an energy beam, such as laser beam, is emitted from the outside of an outer case to weld the outer case to a current collecting tab, so that the occurrence of sputter inside a battery is prevented (for instance, see PTLs 1 to 3).

Furthermore, in order to decrease electric resistance inside a battery, two or more current collecting tabs connected to the same electrode of an electrode body are connected to an outer case (for example, see PTLs 1 and 2).

A battery of which two or more current collecting tabs and an outer case are connected to each other according to PTL 1 is described with reference to FIG. 10. In this battery, a laser beam is emitted from the outside of an outer case 14, in which an electrode body 11 is disposed, to weld two or more current collecting tabs 12a, 12b, 12c, and 12d to the outer case 14 via one weld 13. The depth of the weld 13 is controlled by adjusting the energy and radiation time of the laser.

CITATION LIST

Patent Literature

PTL 1: Japanese Published Unexamined Patent Application No. 2010-3686
PTL 2: Japanese Published Unexamined Patent Application No. 2015-162326
PTL 3: Japanese Published Unexamined Patent Application No. 2016-207412

SUMMARY OF INVENTION

Technical Problem

In the case where one current collecting tab connected to an electrode body is welded to an outer case by an energy beam, it is necessary to produce sufficient weld strength. When the output of an energy beam, such as a laser beam, emitted from the outside of the outer case is too high, the melted part penetrates the current collecting tab to cause sputter inside the battery. Since the thickness of a current collecting tab is generally smaller than that of the outer case, the output of the energy beam to be emitted needs to be precisely controlled to produce sufficient weld strength and to prevent the weld from penetrating the current collecting tab.

In the case where two or more current collecting tabs are welded to an outer case by an energy beam, a part at which multiple current collecting tabs overlap each other can be welded to the outer case via one weld by radiation of an energy beam as in Patent Literature 1. In order to gain a joint area enough to produce sufficient weld strength, an energy beam needs to have a large spot diameter; in view of using two or more current collecting tabs, the output of an energy beam to be emitted needs to be very high. The tolerance of the output of an energy beam emitted to weld a current collecting tab to an outer case is determined on the basis of a first condition for preventing the generation of sputter and a second condition for producing sufficient weld strength between the current collecting tab and the outer case.

In the case where two or more current collecting tabs are used, it is necessary to consider that the sum of the thickness of the outer case and the thicknesses of the current collecting tabs varies to a large extent and that the output of an energy beam needs to be large. Since the output of an energy beam includes a constant rate of variation, the absolute quantity of the range of the variation in the output of the energy beam increases when the output becomes large. Hence, in the case where two or more current collecting tabs are used, securing the margin of the output of an energy beam is hard, which is problematic. In addition, a high-power beam generator, such as laser oscillator, needs to be used, which results in a problem of an increase in the cost of equipment. In the present disclosure, the percentage (%) of the tolerance (absolute quantity) of the output, which is determined from the first and second conditions for the output of the energy beam, is used as an index of the margin of the output in view of an effect of the output of an energy beam on the tolerance of the output.

It is an object of the present disclosure to provide a battery that can be produced with high quality and at low costs by decreasing the output of an energy beam used to weld multiple current collecting tabs to an outer case and securing the sufficient margin of the output; it is another object of the present disclosure to provide a method for producing such a battery.

Solution to Problem

A battery according to the present disclosure includes multiple current collecting tabs connected to one of a positive electrode and a negative electrode, wherein an outer case and an overlapping part at which multiple current collecting tabs overlap each other are welded to each other via a weld group formed so as to extend from an outer surface of the outer case to the overlapping part, the weld group includes a first weld and second weld that are each in a linear form when the weld group is viewed from the outside of the outer case, the first weld serves to weld the outer case to all of the multiple current collecting tabs, and the second weld serves to weld the outer case to only one or some of current collecting tabs.

A method for producing a battery according to the present disclosure includes a welding step for welding an outer case to an overlapping part at which multiple current collecting tabs connected to one of a positive electrode and a negative electrode overlap each other, wherein the welding step includes welding of a first weld in which a first energy beam having a first energy amount is radiated from the outside of the outer case to form a first weld to weld the outer case to all of the multiple current collecting tabs and welding of a second weld in which a second energy beam having a second energy amount smaller than the energy amount of the first energy beam is radiated to form a second weld to weld the outer case to only one or some of the multiple current collecting tabs.

Advantageous Effects of Invention

The battery and the production method thereof according to the present disclosure enables a reduction in the output of an energy beam used for welding multiple current collecting tabs to an outer case, which enables the output of the energy beam to have a sufficient margin and leads to a reduction in an equipment cost. Hence, the present disclosure can provide a battery that can be produced with high quality and at low costs and a method for producing such a battery.

BRIEF DESCRIPTION OF DRAWINGS

FIG. 1B is a bottom view illustrating the non-aqueous electrolyte secondary battery illustrated in

FIG. 1A.

DESCRIPTION OF EMBODIMENTS

Embodiments according to the present disclosure will now be described in detail with reference to the accompanying drawings. In the following description, specific shapes, materials, numerals, and directions are examples for better understanding of the present disclosure and can be appropriately modified on the basis of the structure of the battery. The term "substantially", for example, refers to a case in which components are completely the same as each other as well as a case in which components are regarded to be substantially the same as each other. Furthermore, in the case where the following explanation includes multiple embodiments and modifications, it is assumed in the first place that the characteristic parts thereof can be appropriately combined.

The battery that is a cylindrical non-aqueous electrolyte secondary battery is described below; however, the battery may be in another form different from a cylindrical battery, such as a square or rectangular battery. The battery is not limited to a lithium ion secondary battery described below and may be another secondary battery, such as a nickel hydrogen battery or a nickel cadmium battery, or primary battery such as a dry cell battery or lithium battery. An electrode body used in the battery is not limited to a rolled electrode body described below and may be a stacked electrode body in which multiple positive electrodes and negative electrodes are alternately stacked with a separator interposed therebetween.

Figure 1A:
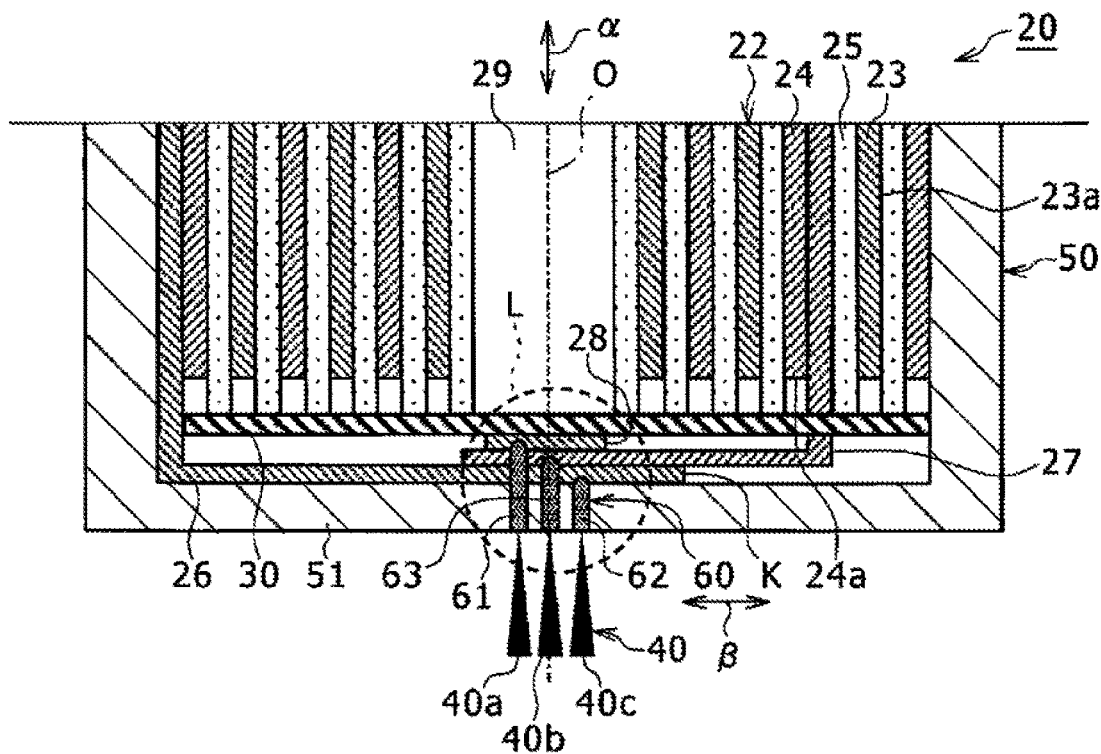
FIG. 1A is a cross sectional view illustrating half of the bottom side of a non-aqueous electrolyte secondary battery as an example of an embodiment.
Figure 1B:
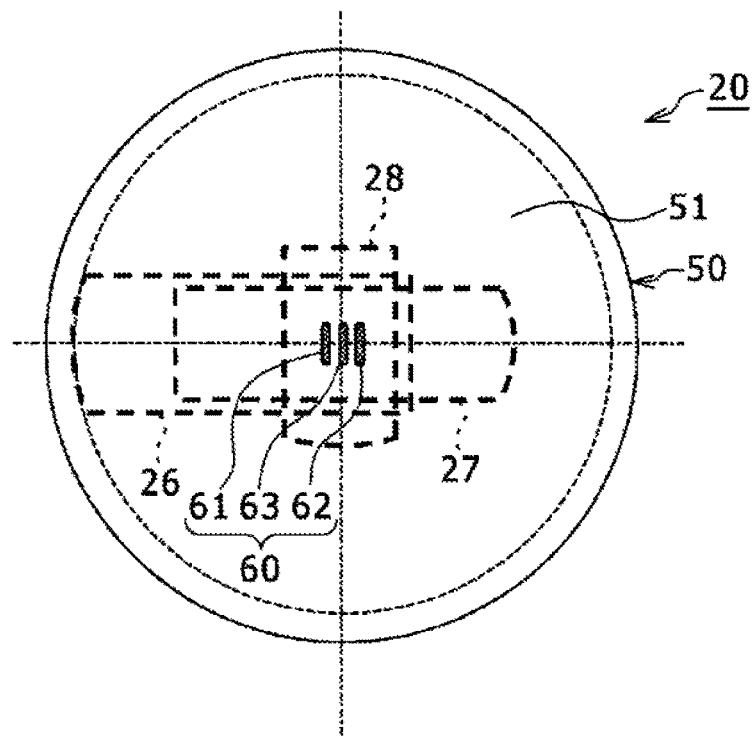

FIG. 1A is a cross sectional view illustrating half of the bottom side of a cylindrical non-aqueous electrolyte secondary battery 20 as an example of the embodiment. FIG. 1B is a bottom view illustrating the non-aqueous electrolyte secondary battery 20. The non-aqueous electrolyte secondary battery is hereinafter referred to as "secondary battery". The secondary battery 20 includes a non-aqueous electrolyte (not illustrated) and a rolled electrode body 22 and an outer case 50 as illustrated in FIGS. 1A and 1B. The rolled electrode body 22 includes a positive electrode 23, a negative electrode 24, and a separator 25; and the positive electrode 23 and the negative electrode 24 are rolled in a spiral form with the separator 25 interposed therebetween. In the following description, one side of the electrode body 22 in the axial direction may be referred to as "upper side", and the other side thereof in the axial direction may be referred to as "lower side". The non-aqueous electrolyte contains a non-aqueous solvent and an electrolyte salt dissolved in the non-aqueous solvent. The non-aqueous electrolyte is not limited to a liquid electrolyte and may be a solid electrolyte using, for instance, a gel polymer.

The positive electrode 23 includes a strip-shaped positive electrode current collector 23a and a positive electrode current collecting tab (not illustrated) bonded to the current collector 23a. The positive electrode current collecting tab is a conductive member that establishes an electrical connection between the positive electrode current collector 23a and a positive electrode terminal (not illustrated) and extends from the upper end of a group of electrodes to one side (upper side in FIG. 1A) in the axial direction a of the electrode body 22. The term "group of electrodes" refers to part of the electrode body 22 other than current collecting tabs. The positive electrode current collecting tab is, for example, provide at substantially the center in the diameter direction p of the electrode body 22.

The negative electrode 24 includes a strip-shaped negative electrode current collector 24a and a first current collecting tab 26, second current collecting tab 27, and third current collecting tab 28 each connected to the current collector 24a. As described later, the first current collecting tab 26, the second current collecting tab 27, and the third current collecting tab 28 correspond to multiple current collecting tabs used in the present disclosure; and the overlapping part K thereof is welded to the outer case 50. The first current collecting tab 26, the second current collecting tab 27, and the third current collecting tab 28 are conductive members that establish electrical connection between the outer case 50 as a negative electrode terminal and the negative electrode current collector 24a and extends from the lower end of a group of electrodes to the other side (lower side in FIG. 1A) in the axial direction a. For instance, the first current collecting tab 26 is provided to an end side on which the rolling of the electrode body 22 ends, and the second current collecting tab 27 is provided at substantially the center in the diameter direction p of the electrode body 22. The third current collecting tab 28 is provided to an end side on which the rolling of the electrode body 22 starts.

Figure 3A:
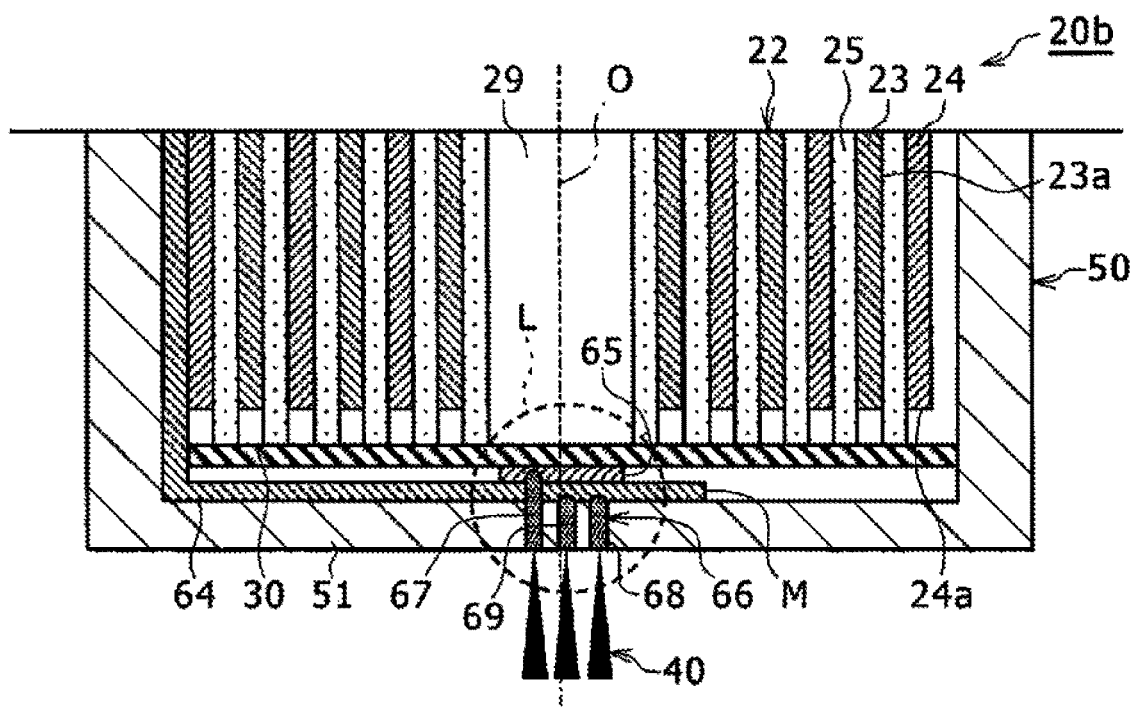
FIG. 3A is a cross sectional view illustrating half of the bottom side of a non-aqueous electrolyte secondary battery as another example of the embodiment.
Figure 3B:
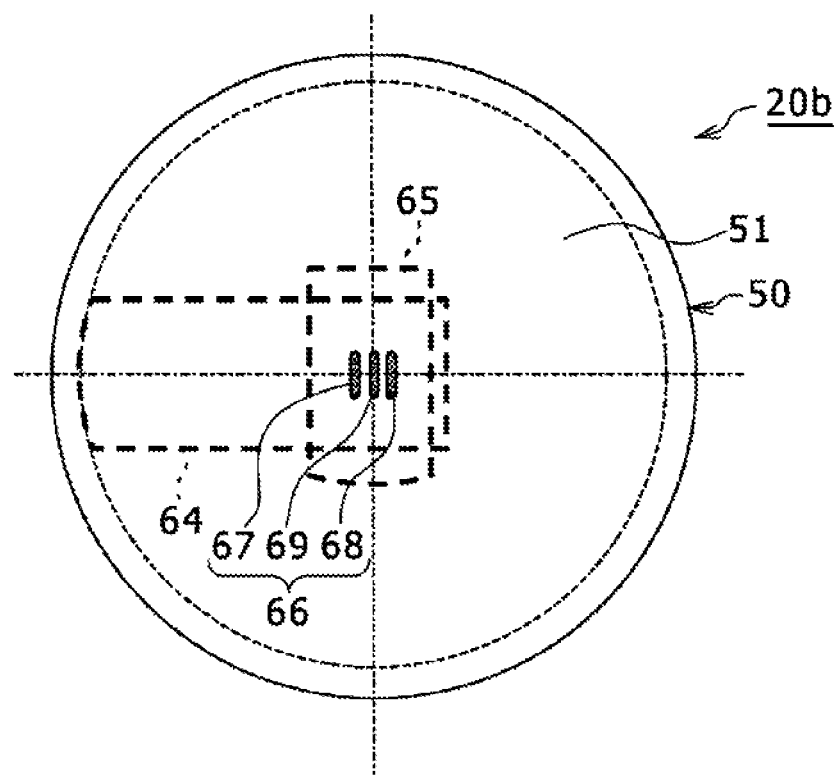
FIG. 3B is a bottom view illustrating the non-aqueous electrolyte secondary battery illustrated in FIG. 3A.

The material for forming the individual current collecting tabs is not particularly limited. The positive electrode current collecting tab is preferably formed of metal mainly containing aluminum; and the first to third current collecting tabs 26, 27, and 28 are preferably formed of metal mainly containing nickel or copper or metal containing both nickel and copper. As illustrated in FIGS. 3A and 3B later, one of the first to third current collecting tabs 26, 27, and 28 may be omitted. Four or more current collecting tabs may be connected to the negative electrode current collector 24a. The number of positive electrode current collecting tabs that are not electrically connected to the outer case 50 as described later is not limited and may be one or more.

The first to third current collecting tabs 26, 27, and 28 are bent substantially at a right angle near a bottom plate 51 of the outer case 50 that will be described later, and the bent parts thereof overlap each other so as to face a roll core 29 of the electrode body 22 with an insulating plate 30 interposed therebetween, thereby forming the overlapping part K. The first current collecting tab 26, the second current collecting tab 27, and the third current collecting tab 28 are stacked in sequence on the inner surface side of the bottom plate 51; and the first current collecting tab 26 is in contact with the bottom plate 51. The overlapping part K is disposed at the center of the inner surface of the bottom plate 51 of the outer case 50 and welded to the outer case 50 in this state via a weld group 60 formed by laser beam 40. The laser beam 40 corresponds to a laser beam. The laser beam 40 includes a first laser beam 40a, second laser beam 40b, and third laser beam 40c that will be described later. In FIG. 1A, the part in which the first to third current collecting tabs 26, 27, and 28 are disposed is denoted by a dashed circle L. The weld group 60 includes welds 61, 62, and 63 that are each in a linear form when they are viewed from the outside of the bottom plate 51 (lower side in FIG. 1A). The term "weld" herein refers to a part in which the outer case 50 and the first to third current collecting tabs 26, 27, and 28 are melted by radiation of the laser beam 40 and then solidified.

The outer case 50 is a bottomed cylindrical metal container. The opening of the outer case 50 is sealed with a sealing member (not illustrated). The outer case 50 contains the electrode body 22 and the non-aqueous electrolyte. The insulating plate 30 is disposed on the lower side of the electrode body 22. The first current collecting tab 26 extends outside the insulating plate 30 to the bottom side of the outer case 50, the second current collecting tab 27 and the third current collecting tab 28 extend to the bottom side of the outer case 50 via through holes (not illustrated) formed in the insulating plate 30, and then these current collecting tabs are welded to the inner surface of the bottom plate 51 of the outer case 50. The bottom plate 51 as the bottom of the outer case 50 has a thickness, for instance, ranging from 0.2 to 0.5 mm.

The electrode body 22 has a roll structure in which the positive electrode 23 and the negative electrode 24 are rolled in a spiral form with the separator 25 interposed therebetween. The positive electrode 23, the negative electrode 24, and the separator 25 are each in the form of a strip and rolled in a spiral form into a structure in which they are alternatively stacked in the diameter direction p of the electrode 22. In the embodiment, the roll core 29 including the roll central axis O of the electrode body 22 is a cylindrical space.

The positive electrode 23 includes the strip-shaped positive electrode current collector 23a and a positive electrode active material layer disposed on the positive electrode current collector 23a. The positive electrode active material layer is, for example, formed on the both sides of the positive electrode current collector 23a. Examples of the positive electrode current collector 23a include foil of metal, such as aluminum, and a film of which such metal is used to form the surface layer. The positive electrode current collector 23a is preferably metal foil mainly containing aluminum or an aluminum alloy.

The positive electrode active material layer preferably contains a positive electrode active material, a conductive agent, and a binder. The positive electrode 23 is, for example, formed by applying a slurry of a positive electrode mixture containing a positive electrode active material, a conductive agent, a binder, and a solvent such as N-methyl-2-pyrrolidone (NMP) to the both sides of the positive electrode current collector 23a and then drying and rolling the applied slurry.

Examples of the positive electrode active material include lithium transition metal oxides containing transition metal elements such as Co, Mn, and Ni. The lithium transition metal oxides are not particularly limited and preferably composite oxides represented by a general formula $Li_{1+x}MO_2$ (in the formula, x is $-0.2<x\leq0.2$, and M contains at least one of Ni, Co, Mn, and Al).

Examples of the conductive agent include carbon materials such as carbon black (CB), acetylene black (AB), KETJENBLACK, and graphite. Examples of the binder include fluororesins such as polytetrafluoroethylene (PTFE) and polyvinylidene fluoride (PVdF), polyacrylonitrile (PAN), polyimide (PI), acrylic resins, and polyolefin resins. Such resins may be used in combination with carboxymethyl cellulose (CMC), salts thereof, or polyethylene oxide (PEO). These materials may be used alone or in combination.

The negative electrode 24 includes the strip-shaped negative electrode current collector 24a and a negative electrode active material layer disposed on the negative electrode current collector 24a. The negative electrode active material layer is, for example, formed on the both sides of the negative electrode current collector 24a. Examples of the negative electrode current collector 24a include foil of metal, such as copper, and a film of which such metal is used to form the surface layer.

The negative electrode active material layer is preferably formed on the both sides of the negative electrode current collector 24a on the entire surfaces except plain parts that will be described later. The negative electrode active material layer preferably contains a negative electrode active material and a binder. The negative electrode 24 is, for example, formed by applying a slurry of a negative electrode mixture containing a negative electrode active material, a binder, and water or another material to the both sides of the negative electrode current collector 24*a* and then drying and rolling the applied slurry.

The negative electrode active material may be any material provided that it can reversibly adsorb and desorb lithium ions. Examples thereof include carbon materials, such as natural graphite and artificial graphite, metals that can be alloyed with lithium, such as Si and Sn, and alloys and composite oxides containing these metals. The binder used in the negative electrode active material layer 36 can be, for instance, the same resin as in the positive electrode 23. In the case where the slurry of the negative electrode mixture is prepared using an aqueous solvent, styrene-butadiene rubber (SBR), CMC or salts thereof, polyacrylic acid or salts thereof, or polyvinyl alcohol may be used in combination. These materials may be used alone or in combination.

The negative electrode 24 includes plain parts in which the surface of metal used in the negative electrode current collector 24*a* is exposed. The plain parts are the parts to which the first current collecting tab 26, the second current collecting tab 27, and the third current collecting tab 28 as negative electrode current collecting tabs are individually connected and in which the surface of the negative electrode current collector 24*a* is not covered with the negative electrode active material layer. The plain parts have a long and substantially rectangular shape in the front view and extends along the axial direction a that is the width direction of the negative electrode 24. The plain parts are formed so as to have a larger width than the current collecting tabs 26, 27, and 28 of the negative electrode.

The current collecting tabs 26, 27, and 28 of the negative electrode are bonded to the surface of the negative electrode current collector 24*a* by welding such as ultrasonic welding. In the example in FIG. 1A, the first current collecting tab 26, the second current collecting tab 27, and the third current collecting tab 28 as negative electrode current collecting tabs are provided at the end side on which the rolling of the negative electrode 24 ends, at the intermediate part in the rolling direction, and at the end side on which the rolling starts, respectively. Disposing the negative electrode current collecting tabs at multiple positions of the negative electrode in this manner enhances current collecting performance. The plain parts are, for example, formed by intermittent application in which the slurry of the negative electrode mixture is not applied to part of the negative electrode current collector 24*a*.

The positive electrode current collecting tab is bonded to the plain part formed on the positive electrode current collector 23*a*, and part of the positive electrode current collecting tab that protrudes upward from the positive electrode current collector 23*a* is bonded to the positive electrode terminal or to the part connected to the positive electrode terminal.

The separator 25 may be a porous sheet having ion permeability and insulating properties. Specific examples of the porous sheet include thin microporous films, woven fabrics, and non-woven fabrics. Suitable examples of the material of the separator 25 include olefin resins, such as polyethylene and polypropylene.

The part at which the first current collecting tab 26, the second current collecting tab 27, and the third current collecting tab 28 overlap each other is irradiated with the laser beam 40 from the outside of the bottom plate 51 (lower side in FIG. 1A), so that the weld group 60 is formed so as to extend from the outer surface of the outer case 50 to the overlapping part K. The laser beam 40 is preferably a laser beam emitted from a fiber laser. The laser beam emitted from a fiber laser has a very small spot diameter, such as approximately from 0.02 mm to 0.05 mm, and thus the melted part formed by such a laser beam emitted from a fiber laser has a very small width such as approximately 0.1 mm. The power density at the converging point of the laser beam can be therefore highly enhanced. Furthermore, the secondary battery 20 is moved in the direction orthogonal to the direction of the laser radiation as described later, and the weld formed by the laser beam is in the form of a thin line when it is viewed from the outside of the bottom plate 51. In this process, the secondary battery 20 can be disposed such that the bottom thereof faces upward, and the laser beam can be radiated to the bottom. Moreover, the secondary battery 20 can be disposed such that the bottom thereof faces sideways, and the laser beam can be radiated to the bottom. In the case where a fiber laser is used, multiple linear welds can be formed to readily produce weld strength.

Viewed from the outside of the bottom plate 51 (lower side in FIG. 1A), the first current collecting tab 26 and the second current collecting tab 27 are orthogonal to the third current collecting tab 28 as illustrated in FIG. 1B at the part at which the first current collecting tab 26, the second current collecting tab 27, and the third current collecting tab 28 superimpose the bottom plate 51. The positions of the first to third current collecting tabs 26, 27, and 28 are not limited to the positions illustrated in FIG. 1B provided that they can form an overlapping part K with the roll core 29 of the electrode body 22 that faces the current collecting tabs with the insulating plate 30 interposed therebetween. The widths of the first current collecting tab 26, second current collecting tab 27, and third current collecting tab 28 in the circumferential direction that is the direction in which the electrode 22 is rolled may be the same as or different from each other.

At the weld 61 included in the weld group 60, the bottom of the outer case 50, the first current collecting tab 26, the second current collecting tab 27, and the third current collecting tab 28 are fused to weld the outer case 50, the first current collecting tab 26, the second current collecting tab 27, and the third current collecting tab 28 together. Hence, the weld 61 corresponds to a first weld. At the weld 62 included in the weld group 60, the bottom of the outer case 50 and the first current collecting tab 26 are fused to weld the outer case 50 to the first current collecting tab 26. Hence, the weld 62 corresponds to a second weld. At the weld 63 included in the weld group 60, the bottom of the outer case 50, the first current collecting tab 26, and the second current collecting tab 27 are fused to weld the outer case 50, the first current collecting tab 26, and the second current collecting tab 27 together. Hence, the weld 63 corresponds to the second weld.

As described above, among the multiple welds 61, 62, and 63 included in the weld group 60, the weld 61 serves to weld the outer case 50 to all of the multiple current collecting tabs of the negative electrode, namely the first current collecting tab 26, the second current collecting tab 27, and the third current collecting tab 28. The weld 61 passes through the first current collecting tab 26 and the second current collecting tab 27 but does not pass through the third current collecting tab 28 that is the innermost current collecting tab.

Among the multiple welds 61, 62, and 63, the weld 62 serves to weld the outer case 50 to only the first current collecting tab 26 that is one of the multiple current collecting tabs of the negative electrode. The weld 62 does not pass through the first current collecting tab 26.

The weld 63 serves to weld the outer case 50 to only the first current collecting tab 26 and the second current collecting tab 27 that are some of the multiple current collecting tabs of the negative electrode. The weld 63 passes through the first current collecting tab 26 but does not pass through the second current collecting tab 27.

In the present disclosure, at least one of the multiple welds corresponds to the first weld, and at least one thereof corresponds to the second weld. The first weld and the second weld may be disposed at any position provided that such a requirement is satisfied. For instance, in the structure illustrated in FIGS. 1A and 1B, the depths of the welds 61 and 63 (lengths in the direction denoted by the arrow a in FIG. 1A) can be changed so that the weld 63 may correspond to the first weld and the welds 61 and 62 may correspond to the second weld. In such a structure, the positions of the first weld and second weld can be also changed.

The welds 61, 62, and 63 have a linear weld shape when they are viewed from the outside of the bottom plate 51 and can be arranged in any order. Since the welds 61, 62, and 63 have a linear weld shape when they are viewed from the outside of the bottom plate 51, the weld shape can be easily formed. The linear relative movement of the laser beam 40 and the outer case 50 in which the electrode body 22 is disposed enables formation of the welds 61, 62, and 63 each having a linear shape and prevents the welds 61, 62, and 63 from intersecting each other.

The outer case 50 and the electrode body 22 are independent structures and connected to each other via only the part at which the outer case 50 is bonded to the first current collecting tab 26. The first current collecting tab 26, the second current collecting tab 27, and the third current collecting tab 28 are bonded to the electrode body 22 that is an integrated single structure having a rolled structure, and the joints between the current collecting tabs do not serve to connect the electrode body 22 and outer case 50, which are independent structures, to each other. Hence, the weld strength between the outer case 50 and the first current collecting tab 26 is preferably larger than the weld strengths between the first current collecting tab 26, the second current collecting tab 27, and the third current collecting tab 28 in order to secure connection between the electrode body 22 and the outer case 50 in fabrication of the battery after the laser welding or in the usage environment of the battery. In other words, the weld strength between the first current collecting tab 26, the second current collecting tab 27, and the third current collecting tab 28 may be smaller than the weld strength between the outer case 50 and the first current collecting tab 26.

The depths of the weld 62 and weld 63 in FIG. 1A are adjusted to be smaller than the depth of the weld 61. This structure enables a reduction in a melt volume necessary for the bonding at the weld group 60 as compared with the case in which the three welds 61, 62, and 63 have the same depth. Thus, the output of the laser beam 40, namely the amount of energy, necessary for melting in the bonded part of the weld group 60 can be reduced. In addition, the sufficient weld strength between the outer case 50 and the first current collecting tab 26 can be produced.

A method for producing the battery according to the embodiment will now be described, the method including a welding process for welding the outer case 50 to the overlapping part K at which the multiple current collecting tabs connected to the negative electrode 24 overlap each other. In this method, when the outer case 50 is welded to the overlapping part K at which the multiple current collecting tabs overlap each other, the welding process includes a step for welding the first weld, a step for welding one second weld, and a step for welding the other second weld. In the step for welding the first weld, the first laser beam 40a as a first energy beam having a first energy amount is radiated from the outside of the outer case 50 that is in contact with at least one of the multiple current collecting tabs of the negative electrode. The radiation of the first laser beam 40a enables all of the multiple current collecting tabs, namely first current collecting tab 26, the second current collecting tab 27, and the third current collecting tab 28, to be melted to weld the outer case 50 to all of the multiple current collecting tabs via the weld 61.

In the step for welding one second weld, the second laser beam 40b as a second energy beam having a second energy amount smaller than the energy amount of the first laser beam 40a is radiated from the outside of the outer case 50. This radiation enables the outer case 50 to be welded to only some of the multiple current collecting tabs, namely the first current collecting tab 26 and the second current collecting tab 27, via the weld 63.

In the step for welding the other second weld, the third laser beam 40c as a third energy beam having a third energy amount smaller than the energy amount of each of the first laser beam 40a and second laser beam 40b is radiated from the outside of the outer case 50. This radiation enables the outer case 50 to be welded to only one of the multiple current collecting tabs, namely the first current collecting tab 26, via the weld 62.

When the third laser beam 40c is radiated to melt the outer case 50 and the first current collecting tab 26, the welding can be performed at an output that is approximately 50% of the output of the first laser beam 40a. When the second laser beam 40b is radiated to melt the outer case 50, the first current collecting tab 26, and the second current collecting tab 27, the welding can be performed at an output that is approximately 75% of the output of the first laser beam 40a. Changing the energy amounts of the laser beams that are to be radiated for the welding in this manner enables formation of the weld 61 at which the outer case 50 is welded to all of the current collecting tabs and formation of the welds 62 and 63 at which the outer case 50 is welded to one or some of the current collecting tabs.

The three welds 61, 63, and 62 are formed by relative movement of the first laser beam 40a, the second laser beam 40b, and the third laser beam 40c to the jacket 50, so that they have a linear weld shape when they are viewed from the outside of the bottom of the outer case 50. The step for welding the first weld, the step for welding one second weld, and the step for welding the other second weld may be carried out in any order; however, a preferred order is as follows: the step for welding the first weld, the step for welding one second weld, and the step for welding the other second weld.

For instance, after the first laser beam 40a is radiated for the step for welding the first weld to form the weld 61, the second laser beam 40b of which the output is reduced to be smaller than the output of the first laser beam 40a is radiated for the step for welding one second weld to form the weld 63. Then, the third laser beam 40c of which the output is further reduced to be smaller than the output of the second laser beam 40b is radiated for the step for welding the other second weld to form the weld 62.

Specifically, the first laser beam 40a is uniaxially moved from the front side of the page of FIG. 1A to the depth side or from the depth side to the front side relative to the outer case 50 in which the electrode body 22 is disposed, thereby forming the weld 61 (step for welding the first weld). Then, the second laser beam 40b is similarly radiated at an interval in the lateral direction on the page of FIG. 1A to form the weld 63 (step for welding one second weld), and the third laser beam 40c is similarly radiated at an interval in the lateral direction on the page of FIG. 1A to form the weld 62 (step for welding the other second weld).

In another example of the production method, the welding of the weld 61 by the first laser beam 40a, the welding of the weld 63 by the second laser beam 40b, and the welding of the weld 62 by the third laser beam 40c can be carried out at the same time.

EXAMPLES

Table 1 shows current collecting tabs having the welds 61, 62, and 63 and the calculated values of the output of the laser beam 40 (laser output) in Comparative Example 1 and Examples 1 to 4. As illustrated in FIGS. 1A and 1B, the weld 61 is one outer line among the three lines of the welds 61, 62, and 63 (for example, the left line in FIG. 1A), and the weld 62 is the other outer line among the three lines of the welds 61, 62, and 63 (for instance, the right line in FIG. 1A). The weld 63 is between the weld 61 and the weld 62. The laser output was calculated at a constant condition of a welding speed of 470 mm/sec, and the other conditions were as follows: the outer case 50 had a thickness of 0.3 mm, and each of the first current collecting tab 26, the second current collecting tab 27, and the third current collecting tab 28 had the same thickness of 0.1 mm. In Table 1, the first current collecting tab 26, second current collecting tab 27, and third current collecting tab 28 to be melted are referred to as a first tab, a second tab, and a third tab, respectively.

weld 62 was formed in only the first current collecting tab 26 and the second current collecting tab 27. In this case, the weld 61 and the weld 63 correspond to the first weld, and the weld 62 corresponds to the second weld.

Example 2

In Example 2, the weld 61 was formed in the first current collecting tab 26, the second current collecting tab 27, and the third current collecting tab 28. The weld 62 and the weld 63 were formed in only the first current collecting tab 26 and the second current collecting tab 27. In this case, the weld 61 corresponds to the first weld, and the weld 62 and the weld 63 correspond to the second weld.

Example 3

In Example 3, the weld 61 was formed in the first current collecting tab 26, the second current collecting tab 27, and the third current collecting tab 28. The weld 62 was formed in only the first current collecting tab 26. The weld 63 was formed in only the first current collecting tab 26 and the second current collecting tab 27. Example 3 corresponds to the above-mentioned structure illustrated in FIGS. 1A and 1B. In this case, the weld 61 corresponds to the first weld, and the weld 62 and the weld 63 correspond to the second weld.

Example 4

In Example 4, the weld 61 was formed in the first current collecting tab 26, the second current collecting tab 27, and

TABLE 1

|  | Weld 61 | Weld 62 | Weld 63 | Laser output | Laser output margin |
|---|---|---|---|---|---|
| Comparative Example 1 | First tab Second tab Third tab (first weld) | First tab Second tab Third tab (first weld) | First tab Second tab Third tab (first weld) | 100% | ±1.9% |
| Example 1 | First tab Second tab Third tab (first weld) | First tab Second tab (second weld) | First tab Second tab Third tab (first weld) | 92.1% | ±2.1% |
| Example 2 | First tab Second tab Third tab (first weld) | First tab Second tab (second weld) | First tab Second tab (second weld) | 84.1% | ±2.3% |
| Example 3 | First tab Second tab Third tab (first weld) | First tab (second weld) | First tab Second tab (second weld) | 76.2% | ±2.5% |
| Example 4 | First tab Second tab Third tab (first weld) | First tab (second weld) | First tab (second weld) | 68.3% | ±2.8% |

Comparative Example 1

In Comparative Example 1, all of the three welds 61, 62, and 63 were formed in the first current collecting tab 26, the second current collecting tab 27, and the third current collecting tab 28. In this case, each of the welds 61, 62, and 63 corresponds to the first weld.

Example 1

In Example 1, the weld 61 and the weld 63 were formed in the first current collecting tab 26, the second current collecting tab 27, and the third current collecting tab 28. The the third current collecting tab 28. The weld 62 and the weld 63 were formed in only the first current collecting tab 26. In this case, the weld 61 corresponds to the first weld, and the weld 62 and the weld 63 correspond to the second weld.

In Table 1, the column of "Laser output" shows a relative amount when the laser output in Comparative Example 1 is 100%. In Table 1, the column "Laser output margin" shows a value calculated as the percentage (%) of the absolute amount of the tolerance of a laser output to the absolute amount of the laser output. The tolerance of the laser output is determined on the basis of a first condition for preventing the generation of sputter and a second condition for producing weld strength.

In Comparative Example 1 in which each of the three welds 61, 62, and 63 was formed in the first current collecting tab 26, the second current collecting tab 27, and the third current collecting tab 28, the laser output margin was 1.9% on both the positive side and the negative side as shown in Table 1.

In Examples 1 to 4 in which a melt volume was reduced in at least one of the weld 62 and the weld 63, the laser output was reduced as compared with Comparative Example 1. As a result, the laser output margin increased to a range from 2.1 to 2.8% on both the positive side and the negative side in each of Examples 1 to 4. In Example 3 corresponding to FIG. 1A, for example, the laser output margin increased to 2.5% on both the positive side and the negative side. This shows that production of the secondary battery 20 by welding current collecting tabs through radiation of a laser beam became easier.

This embodiment enables a reduction in the output of an energy beam used for welding the multiple current collecting tabs of the negative electrode to the outer case 50 as well as production of sufficient weld strength between the first current collecting tab 26 and the outer case 50. Hence, the secondary battery 20 with high reliability can be produced. In addition, since the output of an energy beam can be decreased, the cost of equipment can be reduced, which results in a reduction in the production cost of the secondary battery 20.

In the case where one negative electrode current collecting tab was used, the laser output in the welding was 52.4% on the basis of the same calculation of a laser output as in Table 1. In view of such a result, when equipment including a fiber laser oscillator was used in Comparative Example 1 as the same welding equipment as in the welding in the case in which one negative electrode current collecting tab was used, the fiber laser oscillator had a fear that the maximum output itself thereof be insufficient. In Examples 1 to 4 and Examples 5 and 6 described later and shown in Table 2, the welding was able to be performed with the same fiber laser oscillator as in the welding in the case where one negative electrode current collecting tab was used.

Figure 2:
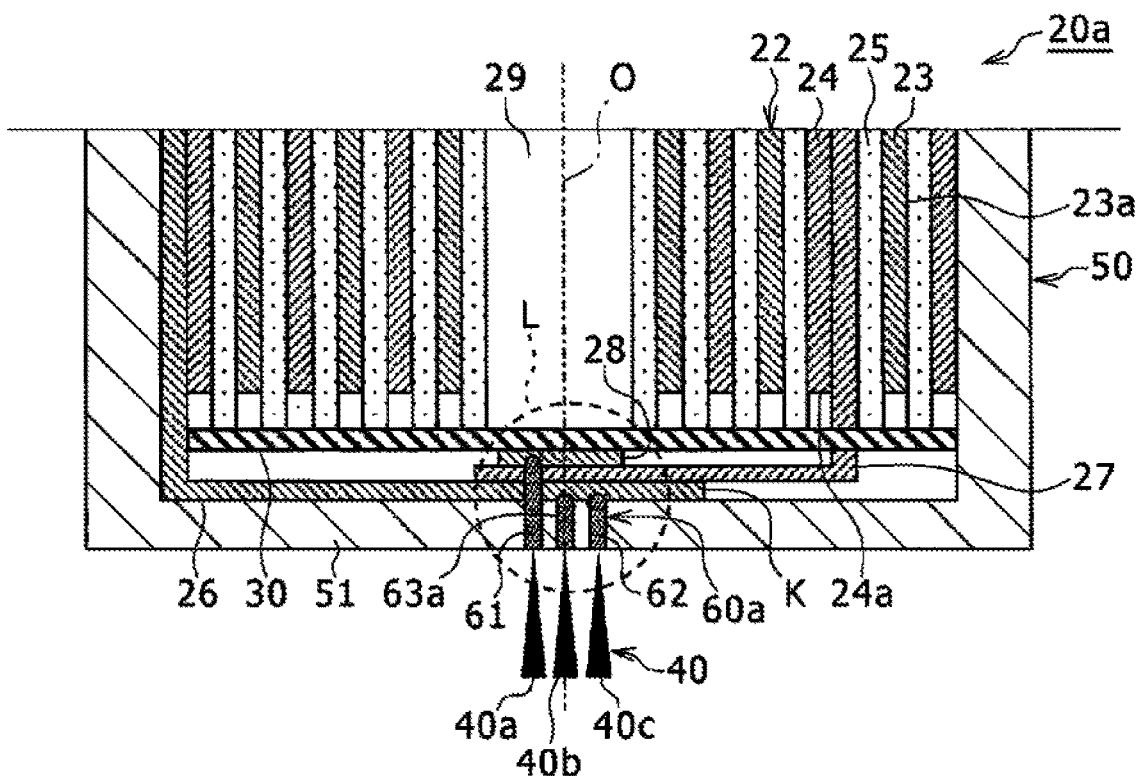
FIG. 2 is a cross sectional view illustrating half of the bottom side of a non-aqueous electrolyte secondary battery as another example of the embodiment.

FIG. 2 is a cross sectional view illustrating half of the bottom side of a secondary battery 20a as another example of the embodiment. In the structure illustrated in FIG. 2, the three current correcting tabs, namely the first current collecting tab 26, the second current collecting tab 27, and the third current collecting tab 28, are welded to the outer case 50 by radiation of the laser beam 40.

The weld group 60a includes three welds 61, 62, and 63a. The weld 63a serves to weld the outer case 50 to only the first current collecting tab 26 as one of the multiple current collecting tabs of the negative electrode and is formed between the two welds 61 and 62. The weld 61 and the weld 62 are the same structure as in FIG. 1A. The structure illustrated in FIG. 2 corresponds to Example 4 in Table 1.

This structure enabled the greatest reduction in the laser output among Examples 1 to 4 in Table 1. Specifically, in such a structure, the laser output was reduced to 68.3% in all of the three welds 61, 62, and 63a as compared with Comparative Example 1 in which all of the current collecting tabs of the negative electrode were melted. As a result, the laser output margin was increased to 2.8% on both the positive side and the negative side, while the laser output margin in Comparative Example 1 was 1.9% on both the positive side and the negative side. Hence, sufficient weld strength can be gained, so that a highly safe and reliable battery can be produced. In this example, the other components and effects are the same as those of the structure illustrated in FIGS. 1A and 1B.

FIG. 3A is a cross sectional view illustrating half of the bottom side of a secondary battery 20b as another example of the embodiment. FIG. 3B is a bottom view illustrating the secondary battery 20b illustrated in FIG. 3A. In the structure illustrated in FIGS. 3A and 3B, a part at which two current collecting tabs, namely a fourth current collecting tab 64 and a fifth current collecting tab 65, overlap each other is welded to the outer case 50 by radiation of a laser beam. The fourth current collection tab 64 has the same structure as the first current collecting tab 26 illustrated in FIG. 1A. The fifth current collection tab 65 has the same structure as the third current collecting tab 28 illustrated in FIG. 1A.

A weld group 66 includes three welds 67, 68, and 69. Specifically, unlike to the structure illustrated in FIGS. 1A and 1B, a current collecting tab corresponding to the second current collecting tab 27 (FIG. 1A) is not used in the structure illustrated in FIGS. 3A and 3B. The fourth current collecting tab 64 and the fifth current collecting tab 65 overlap each other at the center of the inner surface of the bottom of the outer case 50 to form an overlapping part M, and the overlapping part M is welded to the bottom of the outer case 50. The weld 67 included in the weld group 66 serves to weld the outer case 50 to all of the multiple current collecting tabs of the negative electrode, namely the fourth current collecting tab 64 and the fifth current collecting tab 65. Both the weld 68 and the weld 69 serve to weld the outer case 50 to only the fourth current collecting tab 64 that is one of the multiple current collecting tabs of the negative electrode. In the structure of this example, the weld 67 corresponds to the first weld, and the welds 68 and 69 correspond to the second weld.

The weld 69 may be formed in the fourth current collecting tab 64 and the fifth current collecting tab 65 to weld the outer case 50 to the fourth current collecting tab 64 and the fifth current collecting tab 65. In this case, the weld 69 corresponds to the first weld.

Table 2 shows current collecting tabs having the welds 67, 68, and 69 and the calculated values of the output of the laser beam 40 (laser output) in Comparative Example 2 and Examples 5 and 6. As illustrated in FIGS. 3A and 3B, the weld 67 is one outer line of the three lines of the welds 67, 68, and 69 (for example, the left line in FIG. 3A), and the weld 68 is the other outer line of the three lines of the welds 67, 68, and 69 (for instance, the right line in FIG. 3A). The weld 69 is between the weld 67 and the weld 68. The laser output was calculated at a constant condition of a welding speed of 470 mm/sec, and the other conditions were as follows: the outer case 50 had a thickness of 0.3 mm, and each of the fourth current collecting tab 64 and fifth current collecting tab 65 had the same thickness of 0.1 mm. In Table 2, the fourth current collecting tab 64 and fifth current collecting tab 65 to be melted are referred to as a fourth tab and a fifth tab, respectively.

TABLE 2

|  | Weld 67 | Weld 68 | Weld 69 | Laser output | Laser output margin |
|---|---|---|---|---|---|
| Comparative Example 2 | Fourth tab Fifth tab (first weld) | Fourth tab Fifth tab (first weld) | Fourth tab Fifth tab (first weld) | 100% | ±2.5% |
| Example 5 | Fourth tab Fifth tab (first weld) | Fourth tab (second weld) | Fourth tab Fifth tab (first weld) | 89.6% | ±2.8% |
| Example 6 | Fourth tab Fifth tab (first weld) | Fourth tab (second weld) | Fourth tab (second weld) | 79.2% | ±3.2% |

Comparative Example 2

In Comparative Example 2, each of the three welds 67, 68, and 69 was formed in the fourth current collecting tab 64 and the fifth current collecting tab 65. Each of the welds corresponds to the first weld.

Example 5

In Example 5, the welds 67 and 69 were formed in the fourth current collecting tab 64 and the fifth current collecting tab 65, and the weld 68 was formed in the fourth current collecting tab 64. The welds 67 and 69 correspond to the first weld, and the weld 68 corresponds to the second weld.

Example 6

In Example 6, the weld 67 was formed in the fourth current collecting tab 64 and the fifth current collecting tab 65, and the weld 68 and the weld 69 were formed in only the fourth current collecting tab 64. Example 6 corresponds to the structure illustrated in FIG. 3A. The weld 67 corresponds to the first weld, and the welds 68 and 69 correspond to the second weld.

In Table 2, the column of "Laser output" shows a relative amount when the laser output in Comparative Example 2 is 100%. The absolute amount of the laser output in Comparative Example 2 is smaller than the absolute amount of the laser output in Comparative Example 1 in Table 1.

As shown in Table 2, the laser output was decreased to 89.6% and 79.2% in Examples 5 and 6 having a reduced melt volume as compared with Comparative Example 2, respectively. In Example 5 and Example 6, the reduction in the laser output led to an enhancement in the laser output margin on both the positive side and the negative side as compared with Comparative Example 2. Particularly in Example 6 that gave the greatest reduction in the laser output, the laser output margin was increased to 3.2% on both the positive side and the negative side as compared with the laser output margin of 2.5% in Comparative Example 2. In the case where two current collecting tabs of the fourth current collecting tab 64 and the fifth current collecting tab 65 were used and where the melted part was reduced as in Example 6, sufficient weld strength was able to be gained between the fourth current collecting tab 64 and the outer case 50, which enabled production of a highly reliable battery. In this example, the other components and effects are the same as those of the structure illustrated in FIGS. 1A and 1B.

Figure 4A:
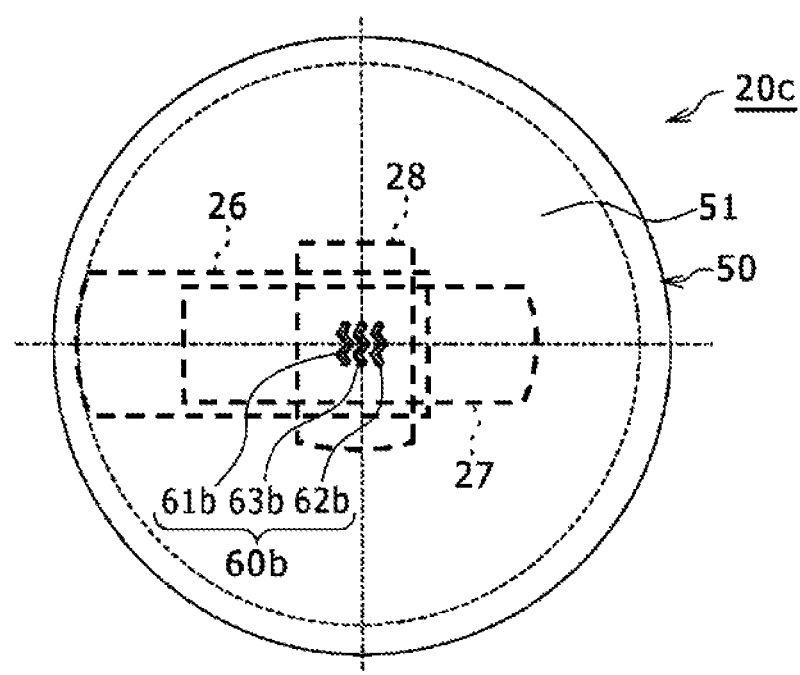
FIG. 4A is a bottom view illustrating a non-aqueous electrolyte secondary battery as another example of the embodiment.

FIG. 4A is a bottom view illustrating a secondary battery 20c as another example of the embodiment. In the structure illustrated in FIG. 4A, each of a weld 61b, weld 62b, and weld 63b of a weld group 60b is in the form of a zigzag wave having a combination of multiple straight lines when it is viewed from the outside of the bottom plate 51 of the outer case 50. Such a structure enables an enhancement in the weld area between the outer case 50 and the current collecting tabs 26, 27, and 28 and therefore gives a high weld strength. In the case where a laser beam and the outer case 50, in which the electrode body is disposed, relatively move in a zigzag manner, the weld area is further increased, which results in enhanced weld strength. The enhanced weld strength leads to an increase in laser output margin. In this example, the other components and effects are the same as those of the structure illustrated in FIGS. 1A and 1B.

Figure 4B:
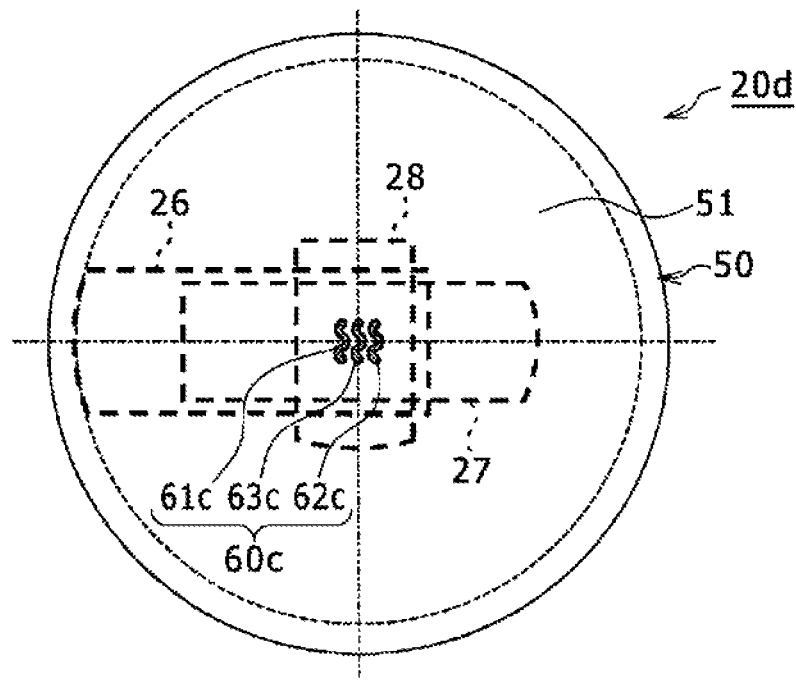
FIG. 4B is a bottom view illustrating a non-aqueous electrolyte secondary battery as another example of the embodiment.

FIG. 4B is a bottom view illustrating a secondary battery 20d as another example of the embodiment. In the structure illustrated in FIG. 4B, each of a weld 61c, weld 62c, and weld 63c of a weld group 60c is in the form of a curved wave when it is viewed from the outside of the bottom plate 51 of the outer case 50. Such a structure enables an enhancement in the weld area between the outer case 50 and the current collecting tabs 26, 27, and 28 and therefore gives a high weld strength as in the structure illustrated in FIG. 4A. In this example, the other components and effects are the same as those of the structure illustrated in FIGS. 1A and 1B or FIG. 4A.

Figure 5:
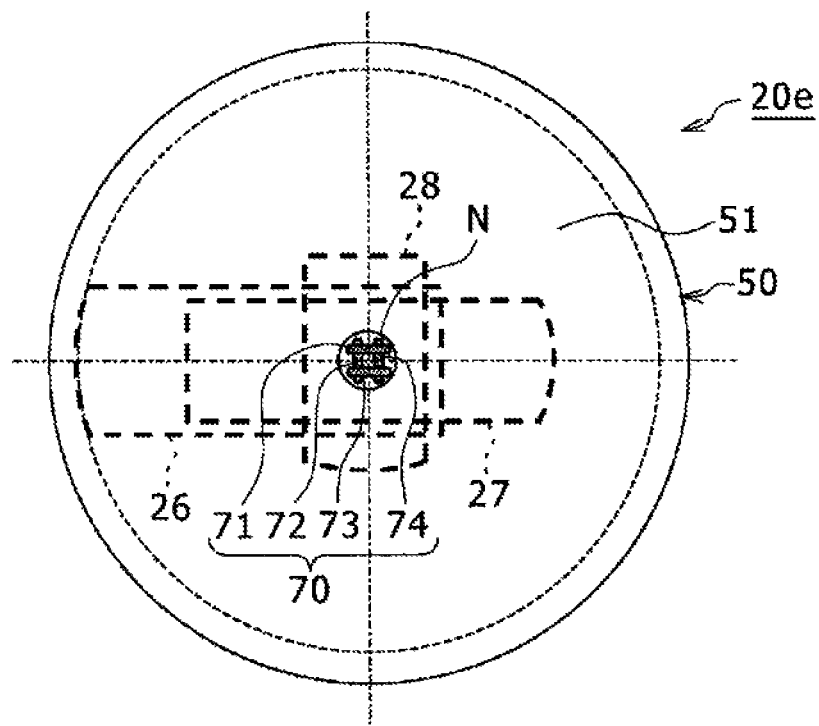
FIG. 5 is a bottom view illustrating a non-aqueous electrolyte secondary battery as another example of the embodiment.

FIG. 5 is a bottom view illustrating a secondary battery 20e as another example of the embodiment. In the structure illustrated in FIG. 5, a weld group 70 includes four welds 71, 72, 73, and 74. The weld group 70 serves to weld the bottom of the outer case 50 to the part at which the first current collecting tab 26, the second current collecting tab 27, and the third current collecting tab 28 overlap each other. The weld 71 and the weld 73, for example, serve to weld the outer case 50 to the first current collecting tab 26, the second current collecting tab 27, and the third current collecting tab 28. In this case, the welds 71 and 73 correspond to the first weld. The weld 72 and the weld 74, for instance, serve to weld the outer case 50 to only one or some of the current collecting tabs 26, 27, and 28 of the negative electrode, such as only the first current collecting tab 26. In this case, the welds 72 and 74 correspond to the second weld. The weld 73 may serve to weld the outer case 50 to only one or some of the current collecting tabs 26, 27, and 28 of the negative electrode. In this case, the weld 73 corresponds to the second weld. One of the weld 72 and the weld 74 may serve to weld the outer case 50 to the first current collecting tab 26, the second current collecting tab 27, and the third current collecting tab 28. In this case, such one weld corresponds to the first weld. The weld 71 and the weld 73 are two parallel lines when they are viewed from the outside of the bottom plate 51 of the outer case 50, and the weld 72 and the weld 74 are similarly two parallel lines. The weld 72 and the weld 74 are orthogonal to the weld 71 and the weld 73 and intersect the weld 71 and the weld 73 at one point. Each of the welds 71, 72, 73, and 74 in FIG. 5 may be in the form of a zigzag wave in FIG. 4A or curved wave in FIG. 4B.

Formation of the four welds 71, 72, 73, and 74 in the manner described above leads to an increase in the weld area, which enables an enhancement in weld strength. In addition, since the welds 71 and 73 intersect the welds 72 and 74, the weld region of the weld group 70 that is denoted by the circle N in FIG. 5 can be decreased. In the case where the secondary battery 20e is connected to an external circuit, such a small weld region enables formation of a large external connection region in the secondary battery 20e, and the secondary battery 20e can be therefore a further appealing product. Although the weld 71 and the weld 72 intersect each other at only one point in FIG. 5, the weld 71 and the weld 72 may be in the form of an arc-like curve or V-shape of which the openings face each other when they are viewed from the outside of the bottom plate 51, so that they intersect each other at two or more points. In the case where the welds are in the form of a wave as in the structures illustrated in FIGS. 4A and 4B and intersect each other, the same effect can be obviously produced.

Figure 6:
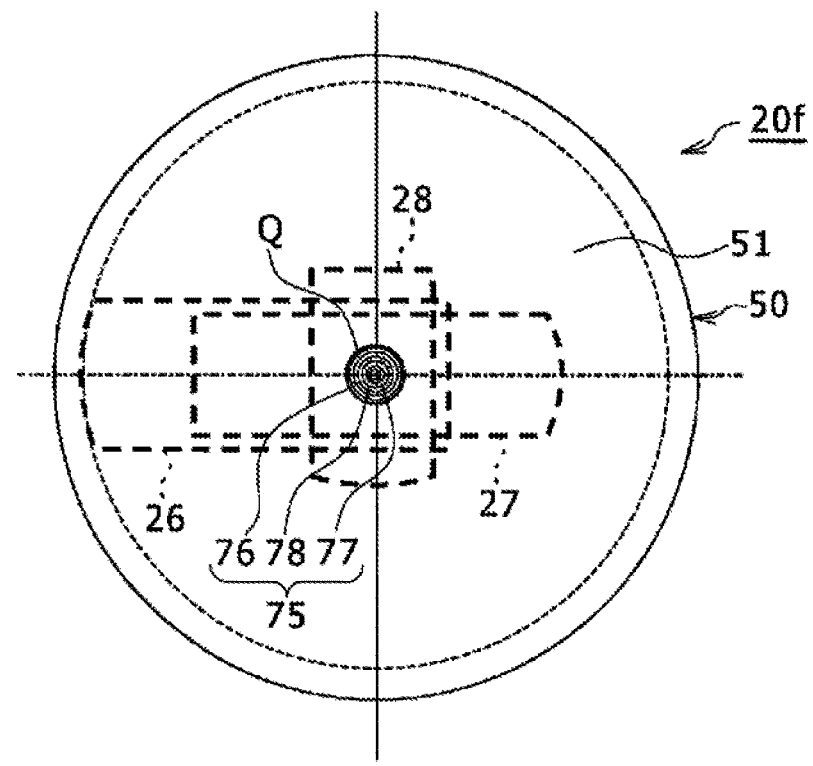
FIG. 6 is a bottom view illustrating a non-aqueous electrolyte secondary battery as another example of the embodiment.
Figure 7:
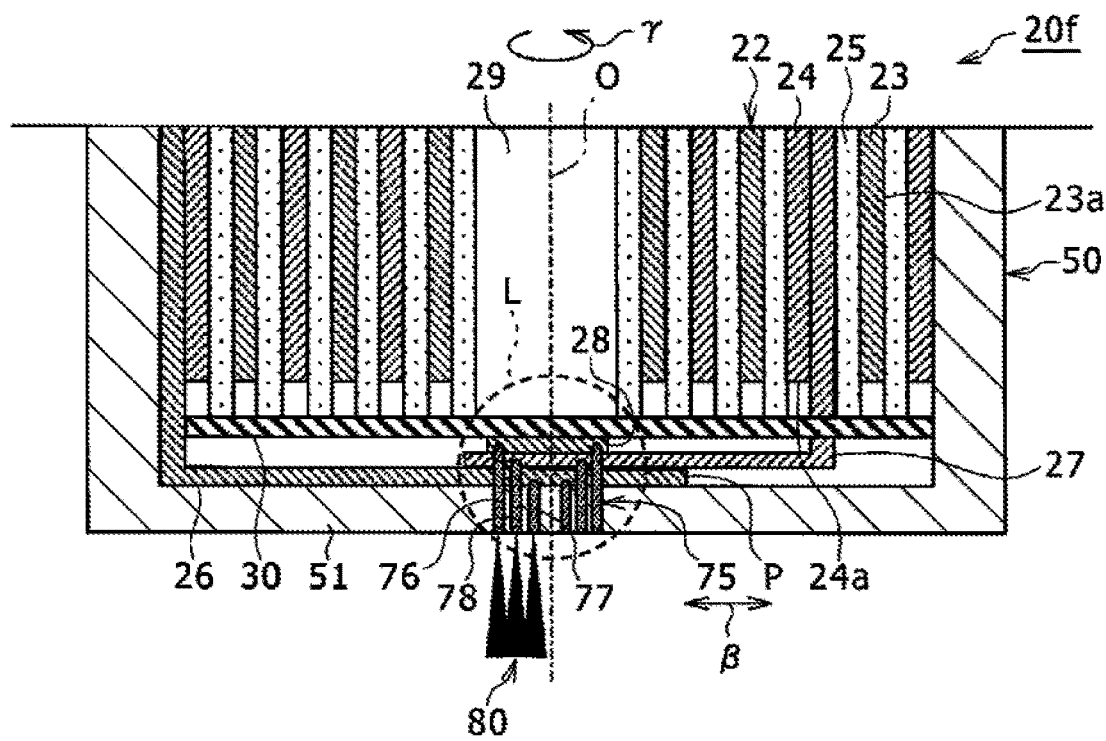
FIG. 7 is a cross sectional view illustrating half of the bottom side of the non-aqueous electrolyte secondary battery illustrated in FIG. 6.

FIG. 6 is a bottom view illustrating a secondary battery 20f as another example of the embodiment. FIG. 7 is a cross sectional view illustrating half of the bottom side of the secondary battery 20f illustrated in FIG. 6. In the structure illustrated in FIGS. 6 and 7, a weld group 75 includes a weld 76, a weld 77, and a weld 78. The weld group 75 serves to weld the bottom of the outer case 50 to an overlapping part P at which the first current collecting tab 26, the second current collecting tab 27, and the third current collecting tab 28 overlap each other. The weld 76, for example, serves to weld the outer case 50 to the first current collecting tab 26, the second current collecting tab 27, and the third current collecting tab 28. In this case, the weld 76 corresponds to the first weld. The weld 77, for instance, serves to weld the outer case 50 to only one or some of the current collecting tabs 26, 27, and 28 of the negative electrode, such as only the first current collecting tab 26. Also the weld 78 serves to weld the outer case 50 to only one or some of the current collecting tabs 26, 27, and 28 of the negative electrode. In this case, the welds 77 and 78 correspond to the second weld. One of the weld 77 and the weld 78 may serve to weld the outer case 50 to the first current collecting tab 26, the second current collecting tab 27, and the third current collecting tab 28. In this case, such one weld corresponds to the first weld. The weld 77 may serve to weld the outer case 50 to only the first current collecting tab 26 and the second current collecting tab 27 among the current collecting tabs of the negative electrode. The three welds 76, 77, and 78 are in the form of concentric circles aligned with the same central axis when they are viewed from the outside of the bottom plate 51 of the outer case 50. For example, the weld 76 has a largest diameter, the weld 77 has a smallest diameter, and the weld 78 has a diameter that is intermediate between the diameters of the weld 76 and the weld 77. Each of the circular welds 76, 77, and 78 illustrated in FIG. 6 may be, for instance, in a non-continuous form, such as a C-shape.

In the case where the weld group 75 having such a structure is formed, the outer case 50, in which the electrode body 22 is disposed, is rotated around the central axis of the outer case 50 in the direction denoted by the arrow y in FIG. 7 with a motor (not illustrated) as a driving part. A laser beam 80 consists of three beams generated by splitting an energy beam with, for instance, a diffraction grating and having different intensities and is radiated to the outer surface of the bottom plate 51 (lower side in FIG. 7) such that the three beams are aligned with each other in a diameter direction p near the center thereof. This radiation enables the bottom plate 51 to be welded to the overlapping part P of the first current collecting tab 26, the second current collecting tab 27, and the third current collecting tab 28 via the weld group 75 that is in the circular form when it is viewed from the outside of the bottom plate 51. In such a production method, a driving part that rotates the outer case 50 as well as the multiple current collecting tabs connected to the same electrode of the electrode body 22 is used to form the circular welds 76, 77, and 78.

The circular welds 76, 77, and 78 enable the length of the weld form to be maximized within a small weld region (region denoted by the circle Q in FIG. 6) as illustrated in FIG. 6; as a result, higher weld strength can be produced. In the structure illustrated in FIGS. 6 and 7, the other components and effects are the same as those of the structure illustrated in FIGS. 1A and 1B. In the structure illustrated in FIGS. 6 and 7, the number of the welds included in the weld group may be two or four or more.

Figure 8:
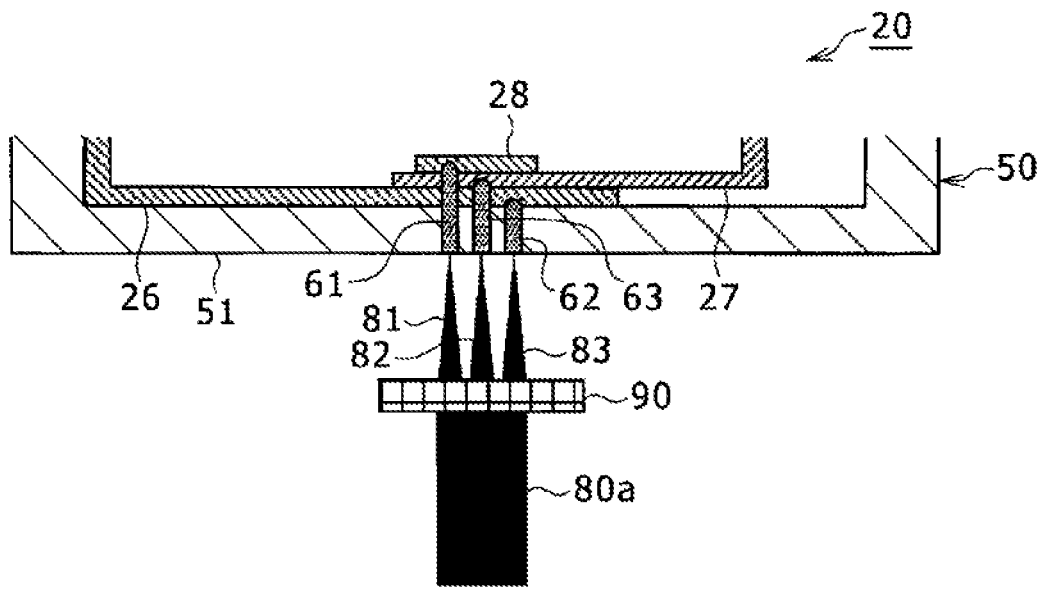
FIG. 8 is a cross sectional view illustrating half of the bottom side of a non-aqueous electrolyte secondary battery in another example of a method for producing the non-aqueous electrolyte secondary battery according to the embodiment for the explanation of a process for welding multiple current collecting tabs to an outer case.

FIG. 8 is a cross sectional view illustrating half of the bottom side of the secondary battery 20 to describe a process for welding the multiple current collecting tabs to the outer case 50 in another example of the method for producing the secondary battery 20 according to the embodiment. In the illustration of FIG. 8, the components of the battery are simplified. FIG. 8 illustrates another example of the method for producing the secondary battery 20 illustrated in FIGS. 1A and 1B. The secondary battery 20 illustrated in FIG. 8 has the same structure as the secondary battery illustrated in FIGS. 1A and 1B. In such another example of the production method in FIG. 8, a laser beam 80a is optically split into a first laser beam 81, a second laser beam 82, and a third laser beam 83 by a diffraction grating 90. The pattern design of the diffraction grating 90 can be controlled to change the laser outputs of the first laser beam 81, second laser beam 82, and third laser beam 83. In particular, when the output of the first laser beam 81 is 100%, the outputs of the second laser beam 82 and third laser beam 83 can be controlled to approximately 75% and 50%, respectively. The combination of the laser outputs of the first laser beam, second laser beam, and third laser beam is the same as the combination of the current collecting tabs melted in the first weld, the second weld, and the third weld in Examples 1 to 4 in Table 1. The diffraction grating 90 in FIG. 8 is used to split the laser beam 80a so as to correspond to any one of Examples 1 to 4. Also in the structure of the secondary battery 20b illustrated in FIGS. 3A and 3B, a diffraction grating can be similarly used to split a laser beam.

Splitting the laser beam 80a by the diffraction grating 90 enables simultaneous formation of the weld 61, weld 62, and weld 63. The first laser beam 81, second laser beam 82, and third laser beam 83 generated by the diffraction grating 90 may be uniaxially moved in the direction from the front side on the page of FIG. 8 to the depth side or from the depth side to the front side relative to the outer case 50 in which the electrode body is disposed. The movement in such a manner enables simultaneous formation of the weld 61, weld 63, and weld 62 that are in a linear form when they are viewed from the outside of the bottom of the outer case 50.

When the first laser beam 81, the second laser beam 82, and the third laser beam 83 move from the front side on the page of FIG. 8 to the depth side or from the depth side to the front side relative to the outer case 50, the laser beams can additionally relatively move in the lateral direction on the page of FIG. 8. This movement enables simultaneous formation of the weld 61b, weld 63b, and weld 62b being in the form of a zigzag wave or a curved wave in the structure illustrated in FIG. 4A or 4B when they are viewed from the outside of the bottom of the outer case 50.

Figure 9:
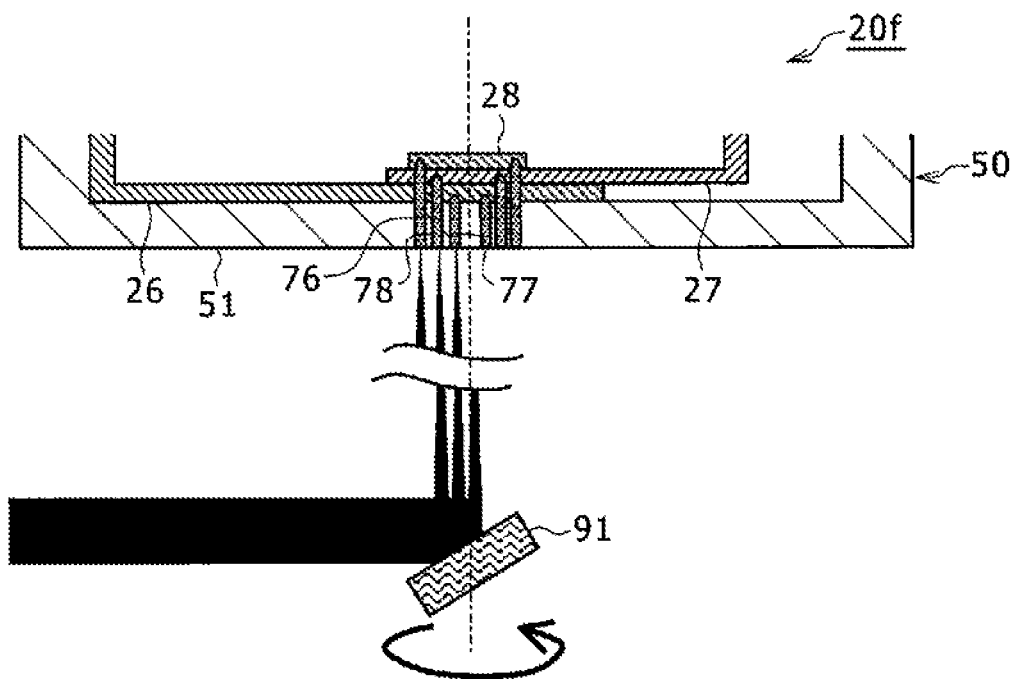
FIG. 9 is a cross sectional view illustrating half of the bottom side of a non-aqueous electrolyte secondary battery in another example of a method for producing the non-aqueous electrolyte secondary battery according to the embodiment for the explanation of a process for welding multiple current collecting tabs to an outer case.
Figure 10:
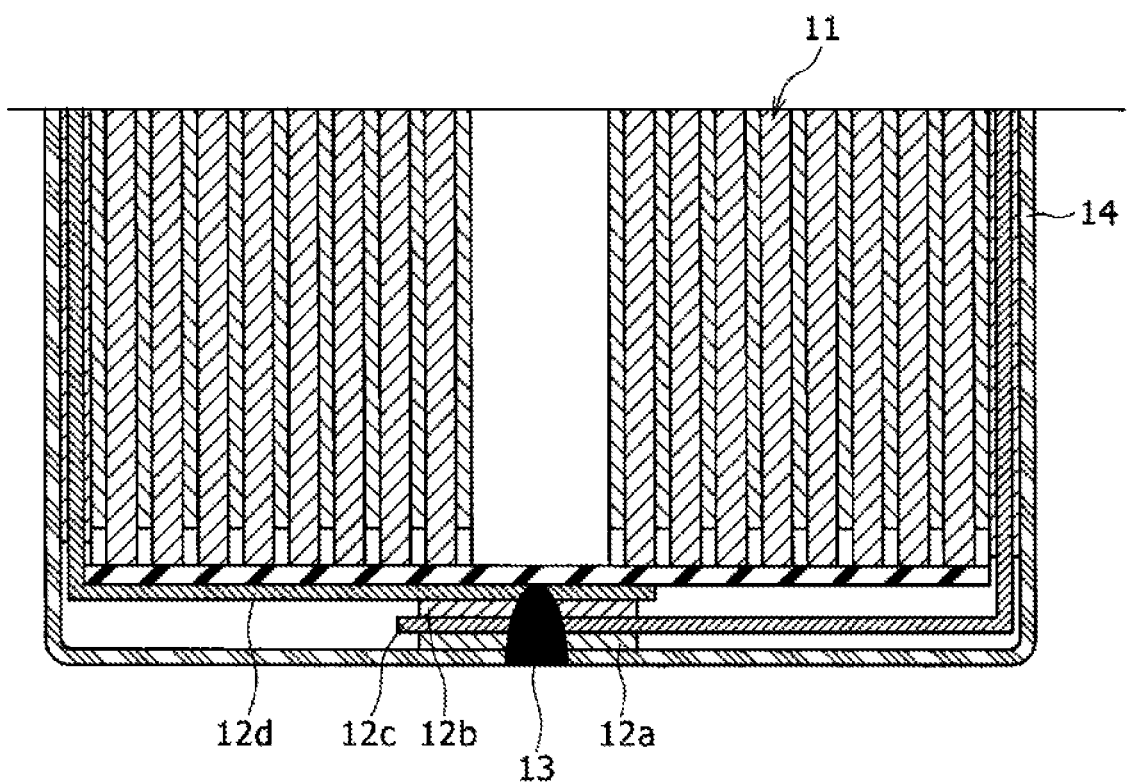
FIG. 10 is a cross sectional view illustrating half of the bottom side of a non-aqueous electrolyte secondary battery of a comparative example.

FIG. 9 is a cross sectional view illustrating half of the bottom side of the secondary battery 20f to describe a process for welding the multiple current collecting tabs to the outer case 50 in another example of the method for producing the secondary battery 20f according to the embodiment. In the illustration of FIG. 9, the components of the battery are simplified. FIG. 9 illustrates another example of the method for producing the secondary battery 20f illustrated in FIGS. 6 and 7. The secondary battery 20f illustrated in FIG. 9 has the same structure as the secondary battery illustrated in FIGS. 6 and 7. In such another example of the production method in FIG. 9, a galvanometer mirror 91 as an optical element is rotatably disposed on the extension of the central axis of the secondary battery 20f so as to be inclined to the extension of the central axis. The laser beam is radiated to the galvanometer mirror 91, and the galvanometer mirror 91 is rotated by a motor (not illustrated) as a driving part in this state to rotate the laser beam radiated to the bottom of the outer case 50 one revolution around the central axis of the bottom. This process enables simultaneous formation of the weld 76, weld 77, and weld 78 that are in the form of a circle when they are viewed from the outside of the bottom of the outer case 50. The driving part for rotating the optical element is used in this manner to form the weld 76, weld 77, and weld 78 that are each in the form of a circle when they are viewed from the outside of the bottom of the outer case 50.

The welding of the multiple current collecting tabs connected to the negative electrode plate to the outer case has been described; however, in the case where the outer case is used as the positive electrode, multiple current collecting tabs connected to a positive electrode plate can be welded to the outer case to apply the structure of the present disclosure.

REFERENCE SIGNS LIST 11 electrode body, 12a to 12d current collecting tab, 13 weld, 14 outer case, 20 and 20a to 20f non-aqueous electrolyte secondary battery (secondary battery), 22 electrode body, 23 positive electrode, 23a positive electrode current collector, 24 negative electrode, 24a negative electrode current collector, 25 separator, 26 first current collecting tab, 27 second current collecting tab, 28 third current collecting tab, 29 roll core, 30 insulating plate, 40 laser beam, 40a first laser beam, 40b second laser beam, 40c third laser beam, 50 outer case, 51 bottom plate, 60, 60a to 60c weld group, 61, 61b, 61c weld, 62, 62b, 62c weld, 63, 63a to 63c weld, 64 fourth current collecting tab, 65 fifth current collecting tab, 66 weld group, 67, 68, 69 weld, 70 weld group, 71, 72, 73, 74 weld, 75 weld group, 76, 77, 78 weld, 80, 80a laser beam, first laser beam, 82 second laser beam, 83 third laser beam, 90 diffraction grating, 91 galvanometer mirror

The invention claimed is:

1. A battery comprising a plurality of current collecting tabs connected to one of a positive electrode and a negative electrode, wherein an outer case and an overlapping part at which the plurality of current collecting tabs overlap each other are welded to each other via a weld group formed so as to extend from an outer surface of the outer case to the overlapping part,
the weld group includes a first weld and second weld that are each in a linear form when the weld group is viewed from the outside of the outer case,
the first weld serves to weld the outer case to all of the plurality of current collecting tabs, and
the second weld serves to weld the outer case to only one or some of the plurality of current collecting tabs including at least one current collecting tab among the current collecting tabs forming the overlapping part, the at least one current collecting tab directly contacting the outer case.

2. The battery according to claim 1, wherein
the second weld serves to weld the outer case to only the at least one current collecting tab directly contacting the outer case.

3. The battery according to claim 1, wherein
the plurality of current collecting tabs are two current collecting tabs.

4. The battery according to claim 1, wherein
the first weld and the second weld do not intersect each other.

5. The battery according to claim 1, wherein
the first weld and the second weld intersect each other in at least one or more points.

6. The battery according to claim 1, wherein
the first weld and the second weld are each in the form of circle when the first weld and the second weld are viewed from the outside of the outer case.

7. A method for producing a battery, the method comprising a welding step for welding an outer case to an overlapping part at which a plurality of current collecting tabs connected to one of a positive electrode and a negative electrode overlap each other, wherein
the welding step includes welding of a first weld in which a first energy beam having a first energy amount is radiated from the outside of the outer case to form a first weld to weld the outer case to all of the plurality of the current collecting tabs and
welding of a second weld in which a second energy beam having a second energy amount smaller than the energy amount of the first energy beam is radiated to form a second weld to weld the outer case to only one or some of the plurality of the current collecting tabs including at least one current collecting tab among the current collecting tabs forming the overlapping part, the at least one current collecting tab directly contacting the outer case.

8. The method for producing a battery according to claim 7, wherein
a diffraction grating is used to split one energy beam into the first energy beam and the second energy beam for simultaneous formation of the first weld and second weld.

9. The method for producing a battery according to claim 7, wherein
the first energy beam and the second energy beam are separately radiated from different positions to form the first weld and the second weld.

10. The method for producing a battery according to claim 7, wherein
a driving part that rotates the plurality of current collecting tabs and the outer case or a driving part that rotates an optical element is used to form the first weld and the second weld that are each in the form of a circle when the first weld and the second weld are viewed from the outside of the outer case.

* * * * *